United States Patent
Ballagas et al.

(10) Patent No.: US 11,210,832 B2
(45) Date of Patent: Dec. 28, 2021

(54) ANIMATED GAZES ON HEAD MOUNTED DISPLAYS

(71) Applicant: Hewlett-Packard Development Company, L.P., Spring, TX (US)

(72) Inventors: Rafael Ballagas, Palo Alto, CA (US); Mithra Vankipuram, Palo Alto, CA (US); Sarthak Ghosh, Palo Alto, CA (US); Eric Matthew Faggin, Palo Alto, CA (US); Mary G. Baker, Palo Alto, CA (US)

(*) Notice: Subject to any disclaimer, the term of this patent is extended or adjusted under 35 U.S.C. 154(b) by 0 days.

(21) Appl. No.: 16/978,400

(22) PCT Filed: Apr. 24, 2018

(86) PCT No.: PCT/US2018/029069
§ 371 (c)(1),
(2) Date: Sep. 4, 2020

(87) PCT Pub. No.: WO2019/209265
PCT Pub. Date: Oct. 31, 2019

(65) Prior Publication Data
US 2021/0042979 A1 Feb. 11, 2021

(51) Int. Cl.
*G06T 13/00* (2011.01)
*G06F 3/01* (2006.01)
(Continued)

(52) U.S. Cl.
CPC .............. *G06T 13/00* (2013.01); *G06F 3/013* (2013.01); *G09G 5/37* (2013.01); *H04N 5/247* (2013.01)

(58) Field of Classification Search
CPC ........... G06T 13/00; G06F 3/013; G09G 5/37; H04N 5/247
See application file for complete search history.

(56) References Cited

U.S. PATENT DOCUMENTS 6,100,943 A * 8/2000 Koide .................... B60K 37/02
349/11
9,753,288 B2 9/2017 Osterhout et al.
(Continued)

OTHER PUBLICATIONS

Mai, C., Rambold, L., & Khamis, M. (Nov. 2017). TransparentHMD: revealing the HMD user's face to bystanders. In Proceedings of the 16th International Conference on Mobile and Ubiquitous Multimedia (pp. 515-520).*

(Continued)

*Primary Examiner* — Sarah Lhymn
(74) *Attorney, Agent, or Firm* — Tong Rea Bentley & Kim LLC

(57) ABSTRACT

In example implementations, a head mounted display (HMD) is provided. The HMD includes a first display, a sensor, an outward facing camera, a processor, and a second display. The first display is to display an image towards a user wearing the HMD. The sensor captures a gaze of the user wearing the HMD. The outward facing camera captures images of a portion of an environment within a view of the user. The processor is communicatively coupled to the sensor and the outward facing camera to generate an animation of the gaze of the user and an augmented reality image on the first display based on the images captured by the outward facing camera. The second display is communicatively coupled to the processor and the first display. The second display displays the animation of the gaze of the user away from the user.

13 Claims, 4 Drawing Sheets

(51) Int. Cl.
  *G09G 5/37*   (2006.01)
  *H04N 5/247*  (2006.01)

(56)              References Cited

U.S. PATENT DOCUMENTS

| | | | |
|---|---|---|---|
| 10,268,438 B2 * | 4/2019 | Chen | A63F 13/213 |
| 2008/0002262 A1 | 1/2008 | Chirieleison | |
| 2013/0237146 A1 | 9/2013 | Serota | |
| 2013/0321265 A1 | 12/2013 | Bychkov et al. | |
| 2015/0206011 A1 | 7/2015 | Jerauld | |
| 2015/0235435 A1 | 8/2015 | Miller et al. | |
| 2015/0362733 A1 | 12/2015 | Spivack | |
| 2016/0253843 A1 | 9/2016 | Lee | |
| 2016/0314624 A1 | 10/2016 | Li et al. | |
| 2017/0045746 A1 | 2/2017 | Ellsworth et al. | |
| 2017/0091535 A1 | 3/2017 | Yu et al. | |
| 2017/0108697 A1 | 4/2017 | El-Ghoroury et al. | |
| 2017/0262045 A1 | 9/2017 | Rouvinez et al. | |
| 2018/0004478 A1 * | 1/2018 | Chen | G06F 3/1454 |
| 2018/0129853 A1 * | 5/2018 | Lee | G06F 3/04842 |
| 2019/0095164 A1 * | 3/2019 | Yamaura | G06T 11/00 |
| 2019/0096106 A1 * | 3/2019 | Shapiro | G06T 13/40 |
| 2019/0285881 A1 * | 9/2019 | Ilic | G06T 17/00 |
| 2019/0371028 A1 * | 12/2019 | Harrises | G06T 11/60 |
| 2021/0012549 A1 * | 1/2021 | Comer | G06K 9/00288 |

OTHER PUBLICATIONS

Chan, L., & Minamizawa, K. (Sep. 2017). FrontFace: facilitating communication between HMD users and outsiders using front-facing-screen HMDs. In Proceedings of the 19th International Conference on Human-Computer Interaction with Mobile Devices and Services (pp. 1-5).*

* cited by examiner

ANIMATED GAZES ON HEAD MOUNTED DISPLAYS

BACKGROUND

Head mounted displays (HMDs) can be used for virtual reality applications. Virtual reality applications allow the user to interact with a virtual world. In other words, the HMDs can display an artificially created world. The user sees the artificial world in the HMD and interacts with other artificial objects, people, environments and the like in the artificial world.

Some devices can be used for augmented reality applications. The augmented reality applications can add artificial objects, people, environments, and the like, to views of the real world. For example, augmented reality may add an avatar of a person or character next to a statue that exists and is viewed through the HMD.

The virtual reality applications and augmented reality applications may be used for a variety of different purposes. For example, the virtual reality applications and the augmented reality applications can be used for entertainment (e.g., video games), training (e.g., simulating a procedure), and the like.

DETAILED DESCRIPTION

Examples described herein provide a head mounted display that animates a user's gaze on a display of the head mounted display (HMD). As discussed above, HMDs can be used for virtual reality (VR) applications and other devices can be used for augmented reality (AR) applications. However, HMDs for VR applications are usually not also used for AR applications.

The present disclosure provides examples of an HMD that can be used for both VR applications and AR applications (or mixed reality applications). For example, outward facing cameras on the HMD can be used for true AR applications. However, the screen of the HMD can be opaque to outside observers. As a result, the outside observers may not know whether the HMD is being used is in a VR mode or an AR mode.

When in the AR mode, the user of the HMD may be looking at people around them. However, others may not want strangers to stare at them unknowingly. Alternatively, when a person is talking to someone wearing an HMD the person may not know whether the user wearing the HMD is looking at the person.

Examples herein further provide an HMD that animates a user's gaze on a display of the HMD. For example, the HMD may include a second display that displays information outward, away from a user of the HMD. The second display may animate a user's gaze such that individuals around the user of the HMD may know where the user of the HMD is looking.

Figure 1:
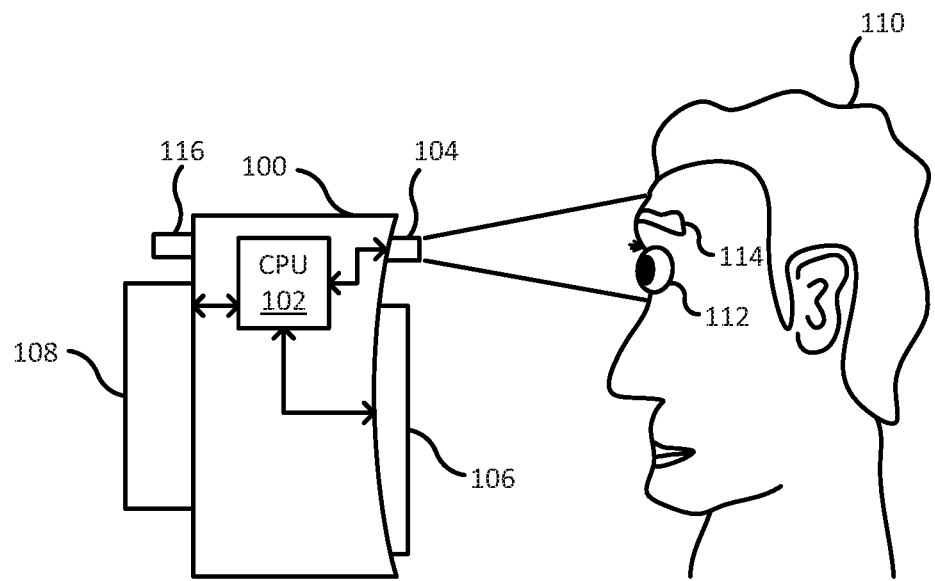
FIG. 1 is a block diagram of an example of head mounted display of the present disclosure.

FIG. 1 illustrates a block diagram of an HMD 100 of the present disclosure. In one example, the HMD 100 may include a processor (e.g., CPU) 102, a sensor 104, a first display 106, a second display 108, and an outward facing camera 116. In one example, the HMD 100 may be a wearable device. The HMD 100 may include arms or a band (not shown) that may allow the HMD 100 to be worn on the head of a user 110.

In one example, the processor 102 may be communicatively coupled to the sensor 104, the first display 106, the second display 108, and the outward facing camera 116. In one example, the sensor 104 may be a pair of cameras. The cameras may be any type of video camera or red, green, blue (RGB) camera. The cameras may be located on an inside (e.g., a side that is adjacent to the face of the user 110) of the HMD 100.

The cameras may capture video images of eyes 112 and eyebrows 114 of the user 110. The captured video images of the eyes 112 and the eyebrows 114 may be used to generate graphical images that represent the eyes 112 and the eyebrows 114, as discussed in further detail below. In one example, the eyes 112 may include all portions of the eyes including the eyelids, the eyelashes, and the eyeball.

In another example, the sensor 104 may comprise microelectrical mechanical systems (MEMS). The MEMS can be used to perform eye tracking.

In one example, the first display 106 may be an inward facing display. The first display 106 may generate graphical images that are shown to the user 110 while the user 110 is wearing the HMD 100.

The HMD 100 may be capable of a virtual reality (VR) mode and an augmented reality (AR) mode. In one example, the outward facing camera 116 may capture images of a portion of an environment within a view of the user for the AR mode. Computer generated images may be added to the real environment to create the mixed reality environment. In one example, the graphical images of the eyes 112 and eyebrows 114 displayed on the second display 108 may indicate that the HMD 100 is in the AR mode In another example, some users may enjoy having the graphical images of the eyes 112 and the eyebrows 114 displayed on the second display 108 for fun even when in the VR mode. In such instances, the HMD 100 may have an indicator light to indicate when the HMD 100 is in the AR mode. When the graphical images of the eyes 112 and the eyebrows 114 are displayed in the VR mode, the processor 102 may receive an indication that the HMD 100 is toggled into the AR mode and cause the indicator light to be activated or to display an indication that the HMD 100 is in the AR mode.

The indicator light may be a particular colored light emitting diode (LED) (e.g., a red LED for AR mode and a green LED for VR mode). The indicator light may be located around the perimeter of the HMD 100 or be a single LED. In one example, a message may be displayed on the second display 108 indicating that the HMD 100 is in the AR mode.

In one example, the VR mode may include a computer generated environment, or an artificially generated environment, that is displayed in the first display 106. The user 110 may interact with the computer generated environment. For example, the user 110 may have interfaces worn on the hands that can be used to provide inputs to the computer generated environment in the VR mode.

In one example, the AR mode may include a mixture of the real environment and computer generated environments or avatars. For example, the user may be at a park with a monument. The user may see the people around the park and the monument through the first display 106. However, the first display 106 may also display computer generated avatars (e.g., cartoon characters, monsters, avatars of other people, and the like) and/or modifications to the environment (e.g., additions to the monument, other buildings around the monument, and the like).

As discussed above, when the HMD 100 is in the AR mode other people around the user 110 may like to know where the user 110 is looking. In addition, when a person is talking to the user 110, the person may like to know whether the user 110 is paying attention to the person or what emotions the user 110 is feeling. In one example, other devices may be communicatively coupled to the HMD 100 to accurately detect the emotions of the user, including electroencephalography, heartrate monitors, respiration monitors, skin temperature sensors, pupil dilation sensors, galvanic skin response, functional near-infrared spectroscopy, and the like.

In one example, the VR mode and the AR mode may be toggled via a physical button on the HMD 100, a hand motion captured by the HMD 100, a voice command, and the like. When the HMD 100 is toggled to the AR mode, the sensor 104 may be activated in response to changing the HMD 100 into the AR mode.

The sensor 104 may capture a gaze of the user 110 while the HMD 100 is in the AR mode. The gaze may include a movement of the eyes 112 and the eyebrows 114 of the user 110 while the user 110 is looking around the AR images displayed in the first display 106. The captured images of the gaze of the user 110 may be forwarded to the processor 102.

The processor 102 may generate an animation, or a graphical representation, of the gaze of the user captured by the sensor 104 (e.g., based on the images captured by a camera). In one example, the animation or the graphical representation, may be an image that represents the eyes 112 and the eyebrows 114 of the user 110 and how the eyes 112 and the eyebrows 114 of the user 110 are moving. In one example, the gaze of the user may be slightly corrected to accurately indicate the "true" direction of the gaze of the user due to an offset of the second display 108 from the eyes 112 of the user.

In one example, the animation may be customized by the user 110. For example, the user 110 may want the animation of the eyes 112 and the eyebrows 114 to be a different color or shape. The user 110 may want the animation to be a monster, an alien, or the eyes and eyebrows of a different animal. In one example, the HMD 100 may include a graphical user interface that allows the user 110 to design, or customize, his or her own animation, or graphical representation, of the eyes 112 and the eyebrows 114 of the user 110.

In one example, the HMD 100 may include a memory. The memory may be a non-transitory computer readable storage medium, such as a hard disk drive, a random access memory (RAM), a read only memory (ROM), and the like. The customized animations or graphical representations may be stored in the memory.

In one example, the animation may be a simple graphical representation that does not look like eyes and eyebrows. For example, the animation may be pixelated graphics that show a single pixel for the eye and a line of pixels for the eyebrows.

In one example, the animation may be a direct live feed of the images of the eyes 112 and the eyebrows 114 of the user 110 that are captured by the camera 104. In other words, the animation may simply be the actual video footage of the eyes 112 and the eyebrows 114 of the user 110.

The animation of the eyes 112 and the eyebrows 114 of the user 110 may then be displayed on the second display 108. The second display 108 may be an outward facing display (e.g., displays images away from the user 110). As a result, when the HMD 100 is in the AR mode, people around the user 110 may be able to see where the user 110 is looking, how the user 110 is feeling, and the like. For example, the user 110 may not be able to stare at a person using the HMD 100 without other people knowing where the user 110 is looking.

In addition, the animation of the eyebrows 114 with the eyes 112 may help to display the emotion of the user 110. For example, the eyebrows 114 may be raised with wide open eyes 112 when the user 110 is surprised. The eyebrows 114 may be raised with the eyes 112 squinting when the user 110 is happy. The eyebrows 114 may be furrowed or angled with the eyes 112 slightly closed to show the user 110 is focused, or serious. Other combinations of the eyebrows 114 and the eyes 112 may be used to depict other emotions not listed above.

Figure 2:
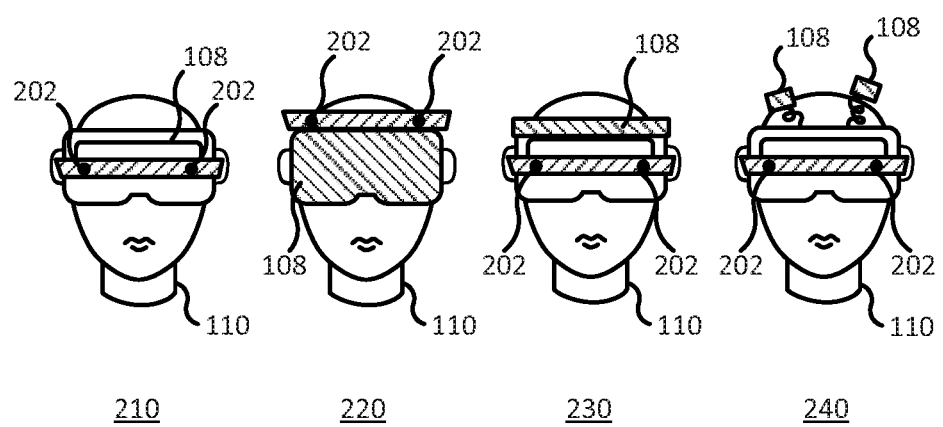
FIG. 2 illustrates different configurations of the head mounted display of the present disclosure.

FIG. 2 illustrates different configurations 210, 220, 230, and 240 of the second display 108 on the HMD 100. It should be noted that the configurations 210, 220, 230, and 240 are provided as examples and that other configurations may be deployed.

In the configuration 210, the second display 108 may be approximately the same size (e.g., length and width) as the first display 106. The second display 108 may cover the entire outer surface of the HMD 100. The HMD 100 may include cameras 202. The cameras 202 may be outward facing cameras similar to the outward facing camera 116 that may be used to capture images of the real environment around the user 110 for the AR mode.

In the configuration 210, the second display 108 may be transparent or partially transparent and cover the cameras 202. In one example, the second display 108 may be partially transparent to allow the cameras 202 to see through the second display 108, but not allow the cameras 202 to be visible to people around the user wearing the HMD 100. For example, the second display 108 may have partial transparency similar to a one-way mirror. As a result, the second display 108 may not block the cameras 202 from capturing images of the real environment around the user 110 for the AR mode.

Figure 3:
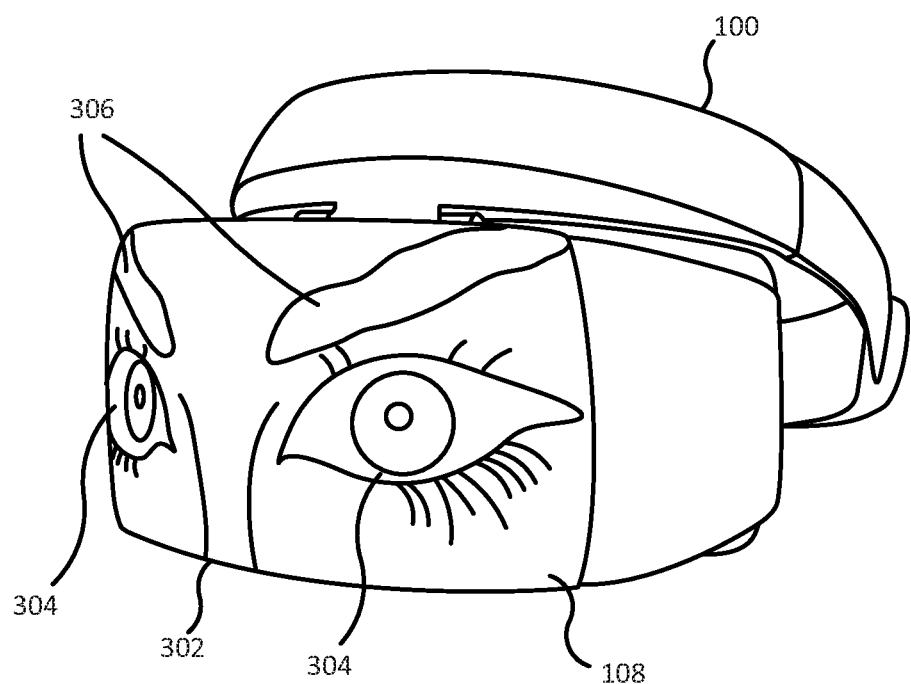
FIG. 3 is an example of an animated gaze displayed by a display of the head mounted display of the present disclosure.

FIG. 3 illustrates and example of the animation 302 that is displayed in the second display 108 in the configuration 210. The animation 302 may appear similarly in the other configurations 220, 230, and 240. As illustrated in FIG. 3, the eyes 304 of the animation 302 may be human eyes and eyebrows 306 of the animation 302 may be human eyebrows. The eyes 304 and the eyebrows 306 may move similarly to how the eyes 112 and the eyebrows 114 of the user 110 are moving. Thus, people around the HMD 100 may see where the user 110 is looking and the emotions of the user 110 based on the eyes 304 and the eyebrows 306 on the second display 108.

As noted above, the animation 302 may include any type of eyes 304 and eyebrows 306. For example, the eyes 304 and the eyebrows 306 may be reptilian, alien, different colors and shapes than the eyes 112 and eyebrows 114, a simple pixelated representation, actual video footage of the eyes 112 and the eyebrows 114, and the like.

Referring back to FIG. 2, the configuration 220 may include the second display 108 that is opaque. The cameras 202 may be moved to be located above the second display 108. For example, the cameras 202 may be located on an outer edge or perimeter of the HMD 100. As a result, the view of the cameras 202 may not be blocked by the second display 108.

In the configuration 230, the second display 108 may be have dimensions that are smaller than the dimensions of the first display 106. The second display 108 may be located along an outer edge (e.g., a top edge or perimeter) of the HMD 100 and the cameras 202 may be located in the middle of the HMD 100 approximately where the eyes 112 of the user 110 would be located. As a result, the second display 108 may be opaque and not block the view of the cameras 202.

In the configuration 240, the second display 108 may comprise a plurality of displays. For example, the second display 108 may include two separate displays that may represent each eye and eyebrow of the user 110. For example, one eye and one eyebrow may be displayed in a left display of the second display 108 and a second eye and a second eyebrow may be displayed in a right display of the second display 108.

The plurality of displays of the second display 108 may be immovably fixed to the top perimeter of the HMD 100. In one example, the plurality of displays of the second display 108 may be movably coupled to the top perimeter of the HMD 100 via springs to provide a "fun" look.

As a result, when the user 110 is in the AR mode, people within the vicinity of the HMD 100 may know where the user 110 is looking. This may help to protect the privacy of people around the user 110 wearing the HMD 100. In addition, displaying the animation of the eyes 112 and the eyebrows 114 of the user 110 may help individuals talking to the user 110 know whether the user 110 is paying attention.

Figure 4:
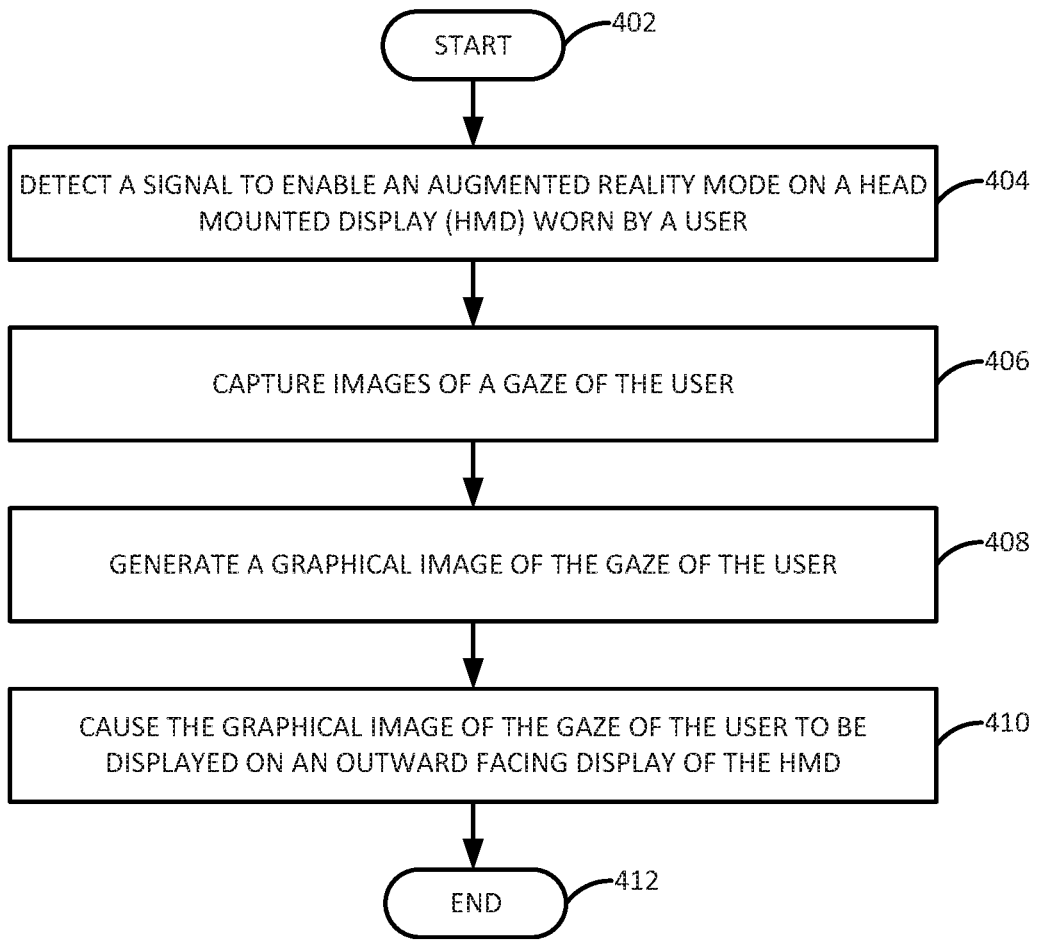
FIG. 4 is a flow chart of an example method for animating a gaze of a user on a display of a head mounted display of the present disclosure.

FIG. 4 illustrates a flow diagram of an example method 400 for animating a gaze of a user on a display of a head mounted display. In one example, the method 400 may be performed by the HMD 100, or the apparatus 500 illustrated in FIG. 5 and described below.

At block 402, the method 400 begins. At block 404, the method 400 detects a signal to enable an augmented reality mode on a head mounted display (HMD) worn by a user. For example, an HMD may be switched back and forth between an augmented reality (AR) mode and a virtual reality (VR) mode. The signal may be enabled by a switch, a voice command, a hand motion, and the like. In one example, an indicator light may be used to notify people around the user with the HMD that the HMD is in the AR mode.

As described above, the AR mode may allow graphical images be displayed with real images seen by the user. For example, the user may look be at a park and see people around a fountain through the HMD and see additional computer generated avatars mixed in with people around the fountain. However, some people may want to know when and where the user with the HMD is looking when in the AR mode.

At block 406, the method 400 captures images of a gaze of the user. In one example, a camera may be located on the inside of the HMD that can capture images of the gaze of the user. The gaze of the user may include the eyes and eyebrows of the user, where the eyes are focused, movement of the eyebrows, and the like. The camera may track the movement of the eyes and the eyebrows.

At block 408, the method 400 generates a graphical image of the gaze of the user. In one example, the graphical image may replicate the gaze (e.g., the movement and position of the eyes and eyebrows) of the user. For example, if the eyes move from right to left, the graphical image may be an animation of the eyes moving from right left. In another example, if the eyebrows are angled in a frown, the graphical image may also have the eyebrows at the same angle in a frown.

In one example, the graphical image may be based on a user customized animation. For example, the user may want the eyes and eyebrows to be of an avatar. The eyes and eyebrows can be customized to be reptilian rather than a human eye. In another example, the eyes and eyebrows may be a desired color that is different than the color of the eyes and eyebrows of the user. In another example, the eyes and eyebrows may be a simple graphical representation (e.g., a dot and a line of dots such as an 8 bit graphical representation).

In one example, the graphical image may be identical to the eyes and eyebrows of the user. For example, the graphical image may have the same color, shape, and features as the eyes of the user. In one example, the graphical image may be a video stream of the video images of the eyes and eyebrows that are captured by the camera.

In one example, a partially transparent representation of the augmented content may be displayed in addition to the graphical image of the eyes and eyebrows of the user. As a result, people around the user can have an awareness that the user may be gazing at digital AR content.

At block 410, the method 400 causes the graphical image of the gaze of the user to be displayed on an outward facing display of the HMD. For example, the graphical images may be transmitted to a graphical processor that generates the images on the outward facing display. The graphical images may be displayed on the outward facing display while the AR view is displayed on an inward facing display of the HMD.

Thus, people around the user may see where the user is looking while the user is viewing the inward facing AR display of the HMD. In addition, the people around the user with the HMD may see the emotions of the user expressed by the eyes and eyebrows of the user.

In one example, a person talking to the user may see where the user wearing the HMD is looking. Thus, the graphical images may show the person whether the user with the HMD is paying attention to the person and not looking around or looking at other images in the inward facing AR display of the HMD.

In one example, the block 406, the block 408, and the block 410 may be repeated until the AR mode is disabled. For example, the video images of the eyes and eyebrows of the user may be continuously captured, graphical images may be continuously generated, and the graphical images may be continuously displayed on the outward facing display of the HMD, while the AR mode is disabled. At block 410, the method 400 ends.

Figure 5:
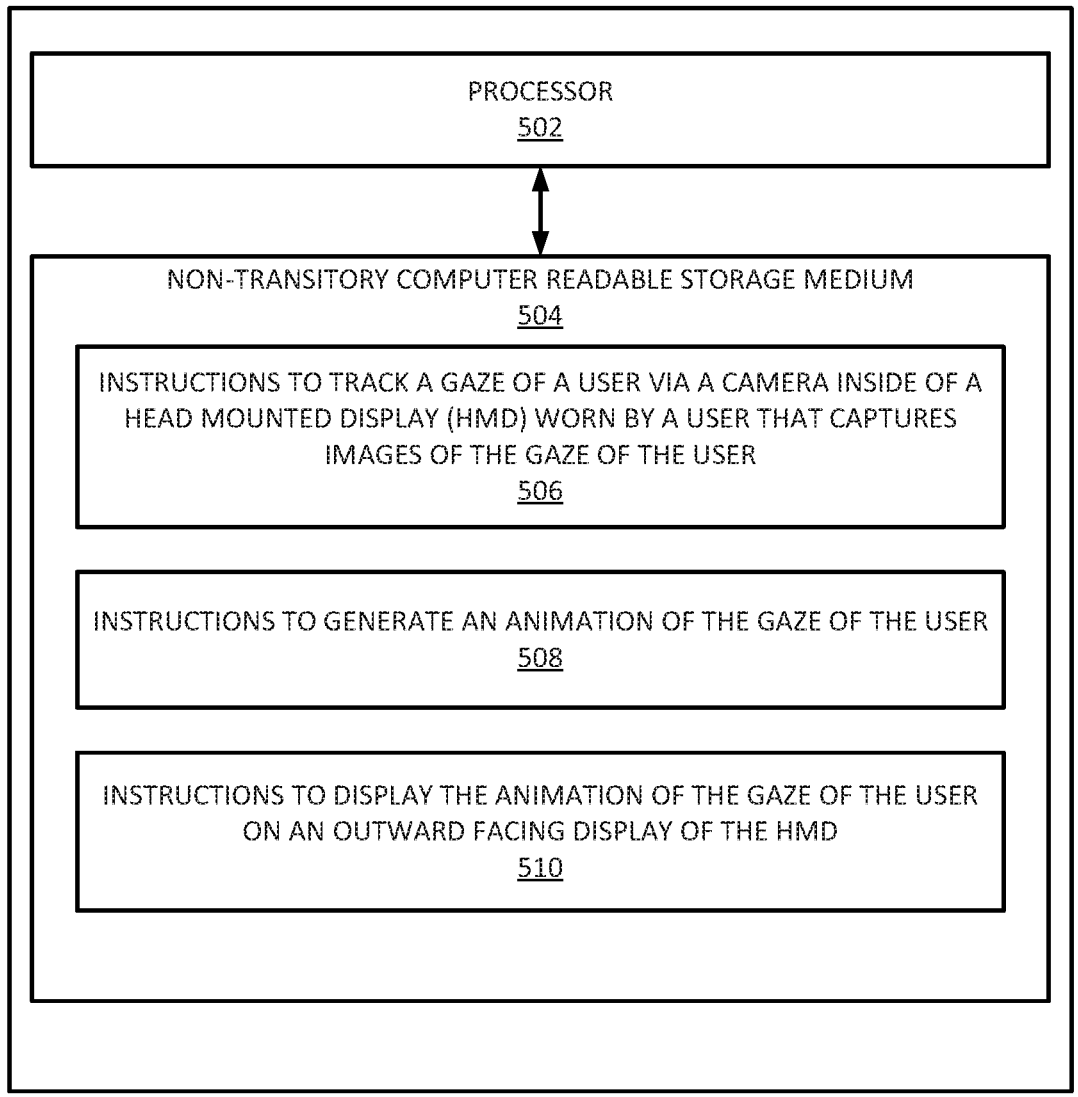
FIG. 5 is a block diagram of an example non-transitory computer readable storage medium storing instructions executed by a processor of the present disclosure.

FIG. 5 illustrates an example of an apparatus 500. In one example, the apparatus 500 may be the HMD 100. In one example, the apparatus 500 may include a processor 502 and a non-transitory computer readable storage medium 504. The non-transitory computer readable storage medium 504 may include instructions 506, 508, and 510 that, when executed by the processor 502, cause the processor 502 to perform various functions.

In one example, the instructions 506 may include instructions to track a gaze of a user via a camera inside of a head mounted display (HMD) worn by a user that captures images of the gaze of the user. The instructions 508 may include instructions to generate an animation of the gaze of user. The instructions 510 may include instructions to display the animation of the gaze of the user on an outward facing display of the HMD.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A head mounted display (HMD), comprising:
   a first display to display an image towards a user wearing the HMD;
   a sensor to capture a gaze of the user wearing the HMD;
   an outward facing camera to capture images of a portion of an environment within a view of the user;
   a processor communicatively coupled to the sensor and the outward facing camera to generate an animation of the gaze of the user and an augmented reality image on the first display based on the images captured by the outward facing camera; and
   a second display communicatively coupled to the processor and the first display, wherein the second display is transparent and placed over the outward facing camera and displays the animation of the gaze of the user away from the user.

2. The HMD of claim 1, wherein the sensor comprises two cameras to capture images of the gaze.

3. The HMD of claim 1, wherein the animation of the gaze includes movement of eyebrows of the user to display an emotion of the user.

4. The HMD of claim 1, wherein dimension of the second display are smaller than dimensions of the first display.

5. The HMD of claim 1, further comprising:
   a computer readable storage medium to store user customized animations of the gaze of the user.

6. A non-transitory computer readable storage medium encoded with instructions executable by a processor, the non-transitory computer-readable storage medium comprising:
   instructions to track a gaze of a user via a camera inside of a head mounted display (HMD) worn by a user that captures images of the gaze of the user;
   instructions to generate an animation of the gaze of user; and
   instructions to display the animation of the gaze of the user on an outward facing display of the HMD, wherein the outward facing display is transparent and placed over an outward facing camera of the HMD.

7. The non-transitory computer readable storage medium of claim 6, further comprising:
   instructions to display an indication that the HMD is in an augmented reality mode.

8. The non-transitory computer readable storage medium of claim 6, wherein the animation comprises human eyes.

9. The non-transitory computer readable storage medium of claim 6, wherein the animation includes eyebrows of the user.

10. A method, comprising:
    detecting, by a processor, a signal to enable an augmented reality mode on a head mounted display (HMD) worn by a user;
    capturing, by the processor, images of a gaze of the user;
    generating, by the processor, a graphical image of the gaze of the user; and
    causing, by the processor, the graphical image of the gaze of the user to be displayed on an outward facing display of the HMD, wherein the outward facing display is transparent and placed over an outward facing camera of the HMD.

11. The method of claim 10, wherein the generating is based on a user customized animation.

12. The method of claim 10, wherein the capturing, the generating, and the causing are repeated until the augmented reality mode is disabled.

13. The method of claim 10, wherein the causing the graphical image to be displayed on an outward facing display of the HMD is performed while an augmented reality view is displayed on an inward facing display of the HMD.

* * * * *